United States Patent Office 3,796,567
Patented Mar. 12, 1974

3,796,567
PROCESS FOR PRODUCING AUSTENITIC STEELS WELDABLE WITHOUT DROPLET FORMATION
Gerhard Kohlert and Wolfgang Stawicky, Altena, Germany, assignors to Vereinigte Deutsche Metallwerke AG, Frankfurt am Main, Germany
No Drawing. Filed July 28, 1972, Ser. No. 276,150
Int. Cl. C21c 5/52, 7/10; C22c 39/20
U.S. Cl. 75—12                    7 Claims

ABSTRACT OF THE DISCLOSURE

A process for producing austenitic steels (especially steel rich in nickel and chromium) which can be welded without the formation of droplets using arc-welding techniques in the presence of the magnetic fields produced thereby. The process comprises melting a steel charge containing 16 to 25% by weight chromium and 8 to 25% by weight nickel and desulfurizing the charge in an electric arc furnace. The carbon content of the melt is reduced to low values by oxygen blowing and a vacuum treatment (e.g. to bring the carbon content to a maximum of 0.02% by weight). The melt is then deoxidized by the addition of conventional deoxidizing agents and adjusted to the desired final composition, e.g. by the addition of alloying elements. Thereupon, the steel melt is treated with metallic calcium in an amount of at least 0.1 gm. of metallic calcium per kilogram of the melt.

FIELD OF THE INVENTION

The present invention relates to a process for the production of austenitic steels, i.e. steels containing at least 16% by weight chromium and at least 8% by weight nickel, which can be welded without the formation of droplets, beads or globular particles of the molten steel during the welding process. The invention also relates to a steel composition which can be welded without the formation of droplets.

BACKGROUND OF THE INVENTION

Austenitic steels of various compositions and various form can be used for the manufacture of articles, apparatus and equipment, e.g. as strip, cubes and the like. In practically all of the fabrication operations, a variety of welding processes can be carried out manually or automatically (i.e. by machine). For example, longitudinally-welded pipe or tube can be made from austenitic steel strip on a large scale for use where corrosion-resistance is desired.

While, for the most part, it is possible to select an alloy steel for any particular application, problems have always been encountered heretofore in the welding of austenitic steel. A problem of significant importance is the formation of droplets adjacent to the seam weld or beads formed by a melting of the substrate metal. The droplets or globular formations may occur on either the upper or the lower side of the weld seam. With some austenitic steels the formation of droplets or globules is always observed whereas it occurs only infrequently with other steels. Furthermore, globule formation is often unpredictable. The occurrence of weld globules is particularly disadvantageous when it occurs with steel compositions which are believed to be weldable without the formation of such globules, especially in the manufacture of pipe and the like in which the globules may be present along the interior of the pipe which is supposed to be free from any discontinuities.

While the reasons for the globule formation have not been fully explained, there have been numerous attempts to prevent the formation of such globules or droplets and to understand the bases for their formation. Although these changes in welding conditions has been successful to avoid or limit globule formation. Although these changes in welding conditions have resulted in uneconomically low welding rates or have even given rise to other welding faults.

Investigations have shown that the globules formed by titanium-stabilized steel always appear at the outer edges of the weld seam or along the underside thereof. The globule contains a high concentration of titanium nitride well above the concentration expected from the titanium and nitrogen present in the melt. Under normal conditions, titanium nitrides rise more or less quickly in a melt, at a rate depending upon the viscosity thereof. For this reason, the appearance of titanium nitrides on the underside of a weld seam or weldment suggests that forces are present which are related to the welding operation itself. Such forces may be affected by the magnetic field in such manner as to be forced out of the pool of molten metal formed by the heat of the arc.

With austenitic steels which are not stabilized with titanium, the globules are found to form mainly on the upper side of this weld seam. These droplets are enriched in aluminum oxide which is paramagnetic and is assumed to be drawn into the magnetic field surrounding the arc.

These investigations indicate that there are relations between the formation of the droplets or globules and the magnetic forces of the electric arc. Attempts to extend these investigations to a relationship between globule formation and the absolute concentrations of titanium, nitrogen, aluminum and oxygen have proved to be unavailing. Welding experiments using charges with entirely identical concentrations of these elements sometimes resulted in globule-free weld seams and sometimes in the formation of the globules. These inconsistent results suggest that the formation of globules at weld seams cannot depend only on the viscosity of the melt and the interaction of the magnetic field with these components in some relationship with the viscosity. In fact, practical experience indicates a high probability that the surface tension of the molten metal formed during welding also plays a significant role.

In some prior-art techniques attempting to reduce viscosity, a high surface tension of the metal has been created. Deoxidizing method have been varied in an attempt to develop a solution to the problem described above, namely, the formation of globules, and these earlier efforts have never proven to be entirely successful.

OBJECTS OF THE INVENTION

It is the principal object of the present invention to provide an improved process for the production of austenitic steels, i.e. steels containing a high concentration of nickel and chromium, that are weldable without globule formation even in the high magnetic fields of electric-arc welding, carried out manually or automatically.

Another object of the invention is to provide an improved process for the production of austenitic steels whereby globule formation is limited or eliminated upon welding in the fabrication of such steels.

Yet another object of the invention is to provide an improved method of making longitudinal-seam welded pipe from austenitic steels such that globule formation along the inner or outer portions of the weld seam is avoided.

Still another object of the invention is to provide an improved austenitic-steel composition which can be welded without globule formation.

DESCRIPTION OF THE INVENTION

We have now surprisingly discovered, after substantial investigation of the globular-formation phenomenon, that it is possible to completely avoid the formation of globules in the welding of austenitic steels when a melt of the latter, subsequent to deoxidation and after establishment of the final composition of the metal in terms of alloying ingredients, carbon, sulfur and phosphorus, is treated with metallic calcium, advantageously in an amount in excess of 0.1 gram of metallic calcium per kilogram of the melt.

In other words, the production of austenitic stainless steel comprises the formation of the melt, deoxidation and adjustment to the desired analysis, followed by the additional step of treating the melt with metallic calcium or with calcium-metal compounds. The following tests were conducted to check the results of the treatment of the melt with calcium. In all cases, the composition of the melt was within the following range:

| | |
|---|---|
| Chromium | 16–25% by weight. |
| Nickel | 8–25% by weight. |
| Manganese | 0–2% by weight. |
| Silicon | 0–3% by weight. |
| Molybdenum | Do |
| Titanium | 0–1% by weight. |
| Carbon | At most 0.20% by weight. |
| Sulfur | At most 0.030% by weight. |
| Phosphorus | At most 0.045% by weight. |
| Iron | Balance. |

Melts of compositions within this range were premelted and carefully desulfurized in an electric-arc furnace. Each melt was subsequently subjected in a vacuum furnace to a controlled oxygen blow followed by a vacuum treatment to reduce the carbon content to the prescribed value.

Depending upon the oxygen content, the melts thus treated were deoxidized with varying amounts of alumina, SiMn, CaSi, FeTi 30% or FeTi 70%. When the charges had been completely treated and adjusted to the desired analysis as regards the alloying elements manganese, silicon, molybdenum, titanium, they were brought to the pouring temperature and poured into a ladle. To form ingots, the charges were poured in a protective argon atmosphere into ingot molds, in some cases immediately and in some cases after an additional treatment with FeTi 70%. The ingots were then rolled to produce a strip which was longitudinally bent to form pipe and welded longitudinally manually and automatically using an arc-welding apparatus without a filler wire. All seamed welds exhibited a formation of globules to a greater or smaller degree, partly on the upper and partly on the lower sides.

When samples of the same charges were melted and metallurgically treated exactly in the same manner, but with the addition of metallic calcium or a calcium-iron alloy (or another calcium-metal alloy), the processes to form strip and welding were carried out without the formation of globules.

The weld seams obtained through the calcium-treated charge did not exhibit the formation of droplets or globules upon welding in any of the cases tested. Tests with varying amounts of calcium have shown that the treatment with calcium will always be successful if at least 0.1 gram or more calcium is added per kilogram of the melt. While there does not appear to be any practical upper limit to the amount of calcium which may be added, amounts in excess of 3 grams per kilogram of the melt appear to be superfluous and of little value.

Globule-free weld seams were formed with all austenitic steels made from melts within the indicated composition range when treated with calcium as stated. This success is obtained with all steels within the composition range regardless of the varying amounts of nickel, chromium, manganese, silicon, molybdenum, titanium and iron. It has also been found that the formation of globules is avoided whether the strip is welded in a manual electric-arc process or is machine welded in an argon arc process. The advantages of welding without the formation of globules are particularly important in the production of longitudinally welded tubes as indicated earlier. For reasons of flow dynamics, the tubes would have not discontinuities and therefore no droplets or globules along the interior of the weld seams. The weld globules can be disadvantageous as well when the tubes are subsequently drawn to increase their length. A further advantage of globule-free weld seams resides in the increase in corrosion resistance at the weld seam by comparison to systems in which such globules are present. In conventional welded tubes in which such globules may be present, the globules are more susceptible to corrosion than the base metal.

SPECIFIC EXAMPLES

Example I

A melt was prepared in an electric-arc furnace from 80% by weight nickel, 18% by weight chromium, 0.5% by weight molybdenum, 0.5% by weight titanium, 0.15% by weight carbon, less than 0.02% sulfur, less than 0.03% phosphorus, and the balance iron. The melt was then subjected to an oxygen blow in a vacuum furnace followed by a vacuum treatment without oxygen injection to reduce the carbon content to the maximum of 0.15%. The melt was then treated with 3% by weight SiMn as a deoxidizer and 0.10% by weight of calcium was added. When the melt was poured into an ingot mold, the ingot solidified and the ingot rolled into strip, the strip could be longitudinally welded to form tubes by manual arc welding or machine arc welding under an argon atmosphere to weld seams completely free from globules.

Example II

A melt was prepared and treated in the manner described in Example I except that the composition, prior to addition of calcium, was as follows:

8% by weight nickel
20% by weight chromium
1.0% by weight manganese
1.0% by weight silicon
0.1% by weight titanium
0.13% by weight carbon
less than 0.03% by weight sulfur
less than 0.04% by weight phosphorus
and the balance iron.

The deoxidizer in this case was 3% of FeTi 30% by weight. The calcium was added in an amount equivalent to 0.12 g. (per kg. of melt) by weight metallic calcium in the form of a calcium-silicon alloy (98% Ca). Again the strip formed from the composition showed no globule formation upon manual arc welding or automatic argon electric-arc welding.

Example III

A composition was prepared and treated as in Example I except that the melt was constituted as 10% by weight (of the finished alloy) of nickel, 22% by weight (of the finished alloy) of chromium, the balance iron. The carbon content was reduced by the vacuum treatment to 0.18% by weight and the sulfur content found to be 0.01% by weight while the phosphorus was less than 0.02% by weight. Prior to the addition of calcium, manganese and molybdenum were added in an amount of 0.5% by weight (of the final alloy) and 1.5% by weight (of the final alloy), respectively. The deoxidizer was 1% by weight FeTi 70% and 3% by weight aluminum. The calcium was added as elemental calcium in an amount corresponding to 0.14 gram per kilogram of the melt. Again the strip formed from the product evidence no globule formation by either of the welding methods described above.

Example IV 0.16 gram of calcium, in an elemental state, was added as described in Example I to each kilogram of a composition consisting of 12% by weight nickel, 16% by weight chromium, 2.0% by weight manganese, 1.0% by weight molybdenum, 0.7% by weight titanium, 0.20% by weight carbon, approximately 0.025% by weight sulfur and approximately 0.035% by weight phosphorus, balance iron. The deoxidizer in this case was 3% by weight CaSi. Again the completed strip showed no evidence of globule formation by a manual electric arc welding or machine argon electric arc welding.

Example V

A melt of the following composition was treated as described in Example I: 8% by weight nickel, 25% by weight chromium, 2.5% by weight silicon, 3.0% by weight molybdenum, 1.0% by weight titanium, 0.15% by weight carbon, 0.0015% by weight sulfur, 0.0010% by weight phosphorus, the balance iron. The deoxidizer was 3% by weight SiMn and the melt was treated with 0.18 gram of metallic calcium per kilogram of the melt. No globule formation was found upon either type of welding of strip made from this composition.

Example VI 0.2 gram of calcium per kilogram of the melt of the following composition was used as described in Example I: 15% by weight nickel, 22% by weight chromium, 1.5% by weight silicon, 0.8% by weight titanium, 0.12% by weight carbon, 0.0015% by weight sulfur, 0.0010% by weight phosphorus. The deoxidizer was 1% by weight aluminum and 3% by weight SiMn. Again no globule formation was observed with either type of welding operating on strip made from the composition in the formation of longitudinal-seam pipe.

Example VII

The composition, prepared as described in Example IV, was, prior to the addition of calcium: 20% by weight nickel, 18% by weight chromium, 1.5% by weight manganese, 0.5% by weight silicon, 2.0% by weight molybdenum, 0.4% by weight titanium, 0.1% by weight carbon, less than 0.025% by weight sulfur, less than 0.030% by weight phosphorus. The deoxidizer was 3% FeTi 30%. No globule formation in welded seams formed on strip of this material was observed.

Example VIII 0.3 gram of metallic calcium was added for each kg. of a melt of the following composition: (prepared in Example IV) 25% by weight nickel, 16% by weight chromium, 0.25% by weight manganese, 2.0% by weight silicon, 0.1% by weight molybdenum, 0.9% by weight titanium, 0.16% by weight carbon, less than 0.025% by weight sulfur, less than 0.030% by weight phosphorus, balance iron. 4% of metallic aluminum was used as a deoxidizer. Again no globule formation was noted on the welding of strip of this composition to form longitudinal-seam pipe.

Example IX

The composition of Example VIII was used except that it was treated with 1.0 g./kg. calcium. Similar results were obtained. Approximately identical results were obtained when 3 grams of calcium were used per kilogram of this melt. Higher amounts of calcium proved to have no effect on the globule formation and was found to be uneconomical.

We claim:
1. A process for producing an austenitic steel weldable without globule formation in an arc-welding process, comprising the steps of: forming an austenitic steel melt with an ultimate content of carbon, alloying metals and iron; and thereafter treating said melt with metallic calcium to render the resulting steel weldable without globule formation by an arc-welding process, said melt being formed by the steps of:
   melting a charge containing nickel, chromium and iron to form an initial melt;
   desulfurizing said initial melt in an electric arc furnace;
   controlling the carbon content of the desulfurized initial melt by oxygen-blowing same and subjecting the oxygen-blown melt to vacuum treatment; and
   deoxidizing the melt subjected to vacuum treatment by the addition of a deoxidizing agent, said metallic calcium being added in an amount of at least 0.1 gram per kilogram of the melt.

2. The process defined in claim 1 wherein the deoxidized melt is adjusted to the final analysis in terms of alloying metals, carbon and iron prior to the addition of metallic calcium thereto by adding at least one alloying element subsequent to deoxidizing.

3. The process defined in claim 1 wherein said deoxidizing agent is selected from the group which consists of aluminum, CaSi, FeTi and SiMn.

4. The process defined in claim 3 wherein the final analysis of the melt is:

| | |
|---|---|
| Chromium | 16–25% by weight. |
| Nickel | 8–25% by weight. |
| Manganese | 0–2% by weight. |
| Silicon | 0–3% by weight. |
| Molybdenum | Do. |
| Titanium | 0–1% by weight. |
| Carbon | At most 0.20% by weight. |
| Sulfur | At most 0.30% by weight. |
| Phosphorous | At most 0.0045% by weight. |
| Iron | Balance. |

5. The process defined in claim 4 wherein the melt, after the addition of calcium is cast into ingots, rolled into strip and strip is longitudinal-seam are welded to form a tube.

6. The process defined in claim 5 wherein the metallic calcium is added as elemental calcium or a calcium-metal alloy.

7. The process defined in claim 6 wherein the calcium is added in an amount less than 3 grams per kilogram to the melt.

References Cited
UNITED STATES PATENTS

| | | | |
|---|---|---|---|
| 3,467,167 | 9/1969 | Mahin | 75—46 |
| 2,799,575 | 7/1957 | Tisdale | 75—55 |
| 3,695,946 | 10/1972 | Demeaux | 75—49 |
| 3,615,369 | 10/1971 | Francis | 75—128 |
| 3,658,516 | 4/1972 | Hachisu | 75—128 |
| 3,619,180 | 11/1971 | Staehle | 75—128 |
| 3,336,132 | 8/1967 | McCoy | 75—49 |
| 2,779,675 | 1/1957 | Vennerholm | 75—55 |
| 3,660,174 | 5/1972 | Jakenberg | 148—12 |

CHARLES N. LOVELL, Primary Examiner

P. D. ROSENBERG, Assistant Examiner

U.S. Cl. X.R.

75—49, 55, 130.5